No. 704,958.  
F. G. DIETERICH.  
ROUND BALE COMPRESS.  
(Application filed Nov. 30, 1901.)  
Patented July 15, 1902.

(No Model.)  
6 Sheets—Sheet 2.

Fig. 2.

WITNESSES:  
Guy V. Worthington  
Louis Dieterich

INVENTOR  
Fred G. Dieterich  
BY  
Fred G. Dieterich & Co.  
ATTORNEYS

No. 704,958. Patented July 15, 1902.
F. G. DIETERICH.
ROUND BALE COMPRESS.
(Application filed Nov. 30, 1901.)

(No Model.) 6 Sheets—Sheet 3.

WITNESSES:

INVENTOR
Fred G. Dieterich
BY
Fred G. Dieterich & Co.
ATTORNEYS

No. 704,958. Patented July 15, 1902.
F. G. DIETERICH.
ROUND BALE COMPRESS.
(Application filed Nov. 30, 1901.)
(No Model.) 6 Sheets—Sheet 5.

WITNESSES:

INVENTOR
Fred G. Dieterich
BY
Fred G. Dieterich & Co
ATTORNEYS

UNITED STATES PATENT OFFICE.

FRED G. DIETERICH, OF WASHINGTON, DISTRICT OF COLUMBIA.

ROUND-BALE COMPRESS.

SPECIFICATION forming part of Letters Patent No. 704,958, dated July 15, 1902.

Application filed November 30, 1901. Serial No. 84,249. (No model.)

*To all whom it may concern:*

Be it known that I, FRED G. DIETERICH, of the city of Washington, in the District of Columbia, have invented a new and Improved Round-Bale Compress, of which the following is a specification.

My invention is in the nature of an improved apparatus for compressing cotton or other fibrous material into round bales; and it especially relates to that type of baling apparatus in which the material to be compressed is formed into thin sheets or layers and the body of the compressed material constantly augmented endwise by each layer, and in which the constantly endwise wound laid sheets or bats in their accumulative condition are pressed against and supported upon a back-pressing means, usually a receding follower. This type of baling apparatus is commonly known as the "Lowry type" and will hereinafter be referred to as the "Lowry press," as said type of press is well disclosed in the patent to G. A. Lowry, No. 581,600, granted April 29, 1897. Briefly stated, the Lowry press in its make-up comprises generally a chamber or holder open at both ends and a slotted cap or head for one end of the holder, the holder and cap being held for rotation. In the operation of a baling-press of the character stated the chamber or holder under the slotted head is first filled by hand with the material to be compressed, after which the slotted cap and chamber are rotated and additional material fed onto the cap over its slot or slots and caught up or engaged by the loose material previously introduced into the chamber by hand, and by reason of the entanglement or interlacing of the material under and over the slotted plate said material above the plate is drawn through the slot or slots in the plate, and on account of its being crowded on top of the material under it said material is condensed and flattened into spiral layers. In some types of the press above referred to a receding follower operates within the baling-chamber, onto which the material as it is compressed is built up on in endwise spiral windings until the bulk is of a predetermined height, when a part thereof (the lower end) sufficient to form a bale is separated from the remainder by suitable means, temporarily tied, and then removed, the latter operation in some instances causing a temporary stopping of the machine and in others no interruption of the endwise spiral folding operation.

The type of machine referred to, while generally effective for producing the endwise-fold round bale, does not practically serve all of the desired purposes. The initial filling of the baling-chamber is objectionable in that much time is wasted in starting the compressed column, and one end thereof (the lower) presents the material in a homogeneous compressed mass. Another and serious disadvantage in the use of the slotted head lies in the manner in which the material is fed from above the plate through the slot, for the reason that the feed of the material depends almost entirely on a thorough entanglement or interlacing of the fibers between the material above and below the plate to such an extent that as the plate is rotated the solid or compressed layers at the upper end of the bale being formed will pull the fibrous material through the slot. As the fibrous material at times becomes choked or clogged at the throats or slots of the cap or presser member, it follows that the connection between the material above and below the slotted plate becomes broken or impaired to such an extent that a uniform or regular drawing in of the material under the slotted presser-plate is impossible, this latter objectionable result being also produced by the tendency of the material (especially when light and fluffy, as in cotton) to bridge or arch above the slot or slots in the cap or head plate, such bridging or arching preventing, as it were, the loose material from coming in sufficiently close to the slots in the head-plate to contact or interlace with the material under the said plate. Numerous devices have been patented for effectively preventing bridging or arching above the slotted head-plates, some of which have been found to some extent practical; but so far as I know no device or devices have been provided which act to feed the material from the hopper to the head-plate in a highly-compressed uniform bat and in an uninterrupted manner. Again, in the operation of a press of the kind above stated, as the feed of the material depends entirely on the tight entanglement or interlacing of the material over and under the head-plate, the pull strain at times is such as to break the fibers, especially long staple cotton, and seriously injure the staple being baled.

My invention, primarily, has for its object to provide a compressing mechanism for forming a round bale on the "end-wound" plan in which all of the objectionable features above referred to and others to be found in the type of baling-presses above stated and in use are avoided, in which the several parts are compactly arranged and especially designed for economical manufacture, and which can be readily employed at any gin-house and manipulated by unskilled labor.

Another and essential feature of my invention lies in the construction of a press of the kind described in which expensive and cumbersome "bridge or arch" breaking and agitating devices are dispensed with and the material fed in a uniform and uninterrupted manner and without requiring an interlacing or entangling pulling action.

My invention also comprehends as a salient feature a means for compressing the staple into a bat and feeding said bat under the presser-head in spiral layers uninterruptedly and directly onto a receding platen or follower at the starting of a bale, whereby, first, to dispense with the preliminary hand-filling of the chamber under the presser-head; second, to maintain a continuous and uniform spiral layer of batting; third, to practically compress all of the air out of the staple before it is entered under the presser-head for its final compression, and, fourth, to reduce the final pressure to a minimum, whereby the expensive receding follower mechanism, such as is required in the patented types of compressers above referred to, is not absolutely required.

In its more complete make-up my invention comprehends a baling-chamber, preferably stationary, (but may rotate in a direction reverse to the direction in which the bat is laid,) a hopper rotatable over the bale-chamber, bat forming and laying compressing-rolls mounted in the rotatable hopper to travel in a circular plane over the baling-chamber and simultaneously revolve in such direction as to draw the fiber into them in the direction of their sweep movement over the baling-chamber and deliver the condensed bat in front of the said rolls, whereby after the bat is compressed and fed out from the compressing-rolls said rolls will also act as a lapping means for laying each superimposed layer of the bulk to constitute the bale. Means are also supported on and rotatable with the rotary hopper having independent vibratory motion to gently agitate the fibrous bulk discharged thereon and having feedways inclined in the direction of the rotation of the hopper and arranged to lead the material to the throat or contacting surfaces of the compressing-rolls.

My invention also consists in other subordinate features and a number of novel details of construction and combination of parts, all of which will hereinafter be fully explained, and particularly pointed out in the appended claims.

To make the scope of my invention clearly understood, I deem it proper to state I am aware it is not broadly new to provide bat forming or compressing rolls and lapping means for laying the bat as it passes from the bat-forming rolls, such general structure being found in patent to E. M. Ivens, No. 623,020, granted April 11, 1899. This part of my invention, however, differentiates from the patent referred to, as the compressing-rolls in my case also form the bat-layers and means for effecting an endwise pressure on the spiral layers and against the follower or opposing pressure member. So far as relates to presses of the Lowry type the feed part of my invention differentiates therefrom in that the staple is initially compressed into a solid bat before it passes under the final or end pressing means and without the exertion or longitudinal pull on the staple fibers. Again, in my construction the staple is whirled around in its bulk with the rotatable hopper agitated and at the same time is fed in a positive direction to the bat-forming rolls, the action of which is to draw the fiber therebetween without danger of pulling out, breaking, or otherwise injuring the long fibers. In other words, in the Lowry press the "pressure" is not exerted on the staple until it passes under the slotted head, whereas in my method of operation the staple is primarily compressed before it passes under the presser-platen or head.

In the most complete construction of my compress the bale-forming mechanism includes a receding follower, which may be of any approved construction—for example, a counterweighted head, upon which the bale is built up. I prefer, however, to use a receding follower of the hydrostatic type, such as is clearly shown in the patent to Ivens aforesaid, No. 623,020. Severing mechanism for parting the bale-section from the accumulated compressed bulk above it and a temporary bale-binding device of an approved construction are also employed and will hereinafter be more definitely referred to.

Having thus set out the general arrangement of my construction of compress and its differentiating features over what has heretofore been accomplished in this art, so far as I know, I shall now describe the details of construction disclosed in the accompanying drawings; but I desire it understood that while the special arrangement of parts shown in the said drawings disclose the general principles of my invention and an assemblage of parts well adapted to accomplish the results desired in an economical, effective, and simple manner, the said parts may be varied or modified without departing from the scope of the appended claims. For example, in the preferred form the hopper, with the bat-forming rolls, is rotatably mounted and the bale-receiving chamber stationary. This may be reversed and the baling-chamber made to rotate and the hopper and bat-forming rolls held stationary or both of said parts, the hopper with the rolls and the bale-chamber, made to rotate, but in opposite directions, and instead of the bat-forming rolls being disposed in a vertical plane, as in the preferred form, they may be in a horizontal plane. All of such modified forms will hereinafter be described in detail.

Referring now to the accompanying drawings, in which like numerals, letters, and characters indicate like parts in all of the figures, Figure 1 is a perspective view of a compress constructed in accordance with my invention. Fig. 6 is a detail view illustrating a slightly-modified construction of my invention, hereinafter referred to.

In the construction of my press the same comprises practically three distinct operating mechanisms, all of which are, however, cooperatively arranged, whereby to provide, first, for the complete compression of a predetermined quantity of the material operated on; second, for severing the compressed bulk into proper bale-sections; third, to temporarily bind the said bale-sections. Of these the compression mechanism embodies nearly all of the essential features of my invention.

The operating parts of my compress are mounted upon a suitably-constructed frame—for example, of the construction shown in Fig. 1—in which A designates a cast-metal base, from which rise angle metal standards A', consisting of the vertical portions $a\ a\ a$ and the downwardly and inwardly curved members $a'\ a'$, which join at the base A to form a central hub or reinforce portion $a^2$ for the receding follower plunger rod or piston P, hereinafter fully described. Upon the upper end of the standards A' is rigidly mounted a circular bed-plate B, having a central opening $b$, through which the baling-chamber C, to be presently described, pendently extends. Projected vertically from the bed-plate B and rigidly secured thereto is a number of rods or posts D, which are braced by annular web portions $b'$, integral with the bed-plate B. The posts D serve as a means for securely bracing the baling-chamber and the compression mechanism and also serve as supports for the stationary upper hopper H, fixedly held by brackets $h\ h$, projected radially from the upper ege of said hopper H and made fast to the reduced upper ends $d\ d$ of the posts D, as clearly shown in Fig. 1.

In the Lowry type of round-bale presses, hereinbefore referred to, the cotton, as before stated, is fed into a stationary hopper, from whence it is drawn under the slotted stationary head in its fluffy or loose state and compressed after it has passed under the slotted head. In my construction of press the action on the cotton is substantially reversed, the same while fed into a stationary hopper (which in my press merely acts as a receiver for the hopper portion proper, indicated by 1) is initially compressed into a sheet or bat, and then fed in spiral laps into the bale-chamber and under the upper presser platen or head, which effects a final pressure on the layers after being superimposed upon the end of the column as it is built up within the baling-chamber.

For effecting a compressing operation of the character just described in a simple, positive, and effective manner I have provided a special construction of rotary hopper and combined bat forming, laying, and pressing devices for opposing the pressure exerted against the lower end of the column by the receding follower or equivalent devices. The said mechanism, the construction of which is clearly illustrated in Figs. 1, 2, 3, 4, and 8, comprises a combination of parts, all of which are mounted to rotate about the central axis of the baling-chamber and several of said parts supported for independent motion during such rotary movement; and the said mechanism consists of what I term a "master" casting or frame F, as the several parts thereof are integrally formed. This frame comprises a horizontal part 2, which I shall hereinafter term the "slotted head," as the same forms the abutment against which the receiving end of the column of compressed material in the baling-chamber bears and which aids in the advancement of the compressed column through the baling-chamber as the spiral layers of the compressed bat are added thereto. The head 2 at its periphery merges with the vertical portion $2^a$, the upper end of which has an annular flange $2^c$ for conveniently attaching the hopper member 1, which is fixedly secured to the frame F to rotate therewith. The frame F also includes a horizontal annular portion $2^d$, the outer portion of which is formed with a master gear-rim $f$, adapted to mesh with and receive motion from the drive-pinion $g$ on the shaft G, presently again referred to. As is clearly shown in Fig. 2, the diameter of the cylinder-chamber $x$ within the vertical portion $2^a$ of the frame F is equal to that of the diameter of the baling-chamber C, and said part $x$ is disposed directly over the upper open end $c$ of said chamber, which end has a beveled inner edge $c'$ to facilitate the entrance of the spiral layers into the chamber C. The frame F is rotatably supported upon friction-rollers 3 3, projected radially from the upper end of the chamber C and just below an annular rim $c^2$, fixedly secured to or formed as an integral part of the chamber C, and whose upper surface has cog-teeth $c^3$, the reason for which will be presently explained.

$f^2$ designates an annular portion of the frame F, pendent from the horizontal part, which has an inturned flange $f^3$, adapted to rest and ride upon the rollers 3 3, and to further reduce friction and facilitate the rotary motion of the frame F ball-races are provided in the opposing surfaces of the members $c^2$ and $f^3$ to receive ball-bearings, (see Fig. 4,) and to further provide for a free movement of the head 2 over the compressed material under it the head 2 is equipped with a number of radially-disposed rollers 4 4.

20 designates a bearing-block projected up centrally from the head 2, the upper end of which is preferably beveled, as at $20^a$, to receive the foot part of a standard 5, which terminates in a socket $5^a$, the purpose of which will presently appear. The head 2 has a number of slots $2^s$, projected radially from the block 20. In the drawings I have shown two of said slots disposed diametrically opposite each other; but a greater or less number may be used, if desired. It is preferred to have but two slots, as it admits of a more practical, positive, and uniform feeding of the fluffy material to the bat forming, laying, and final pressure-applying devices than is possible when a greater number of material-passage slots is provided.

Figure 2:
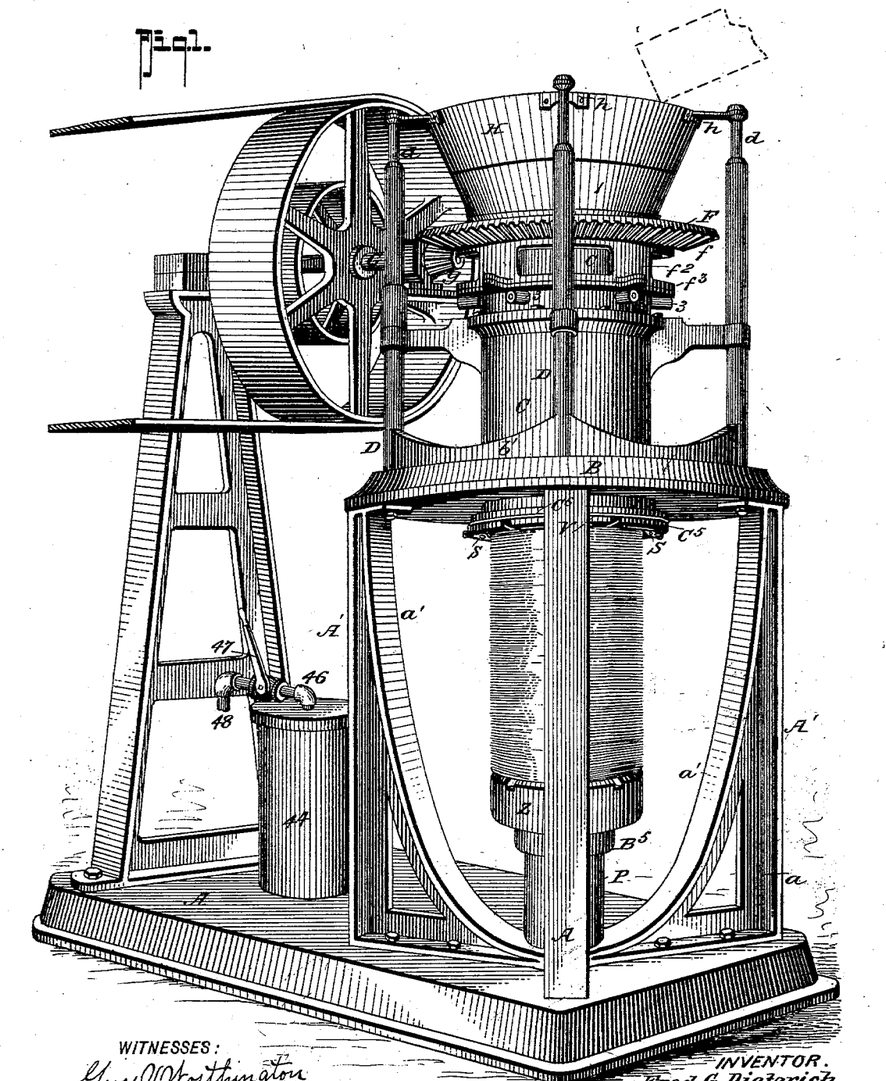
Fig. 2 is a vertical section of the upper bale-forming portion of the press.
Figure 4:
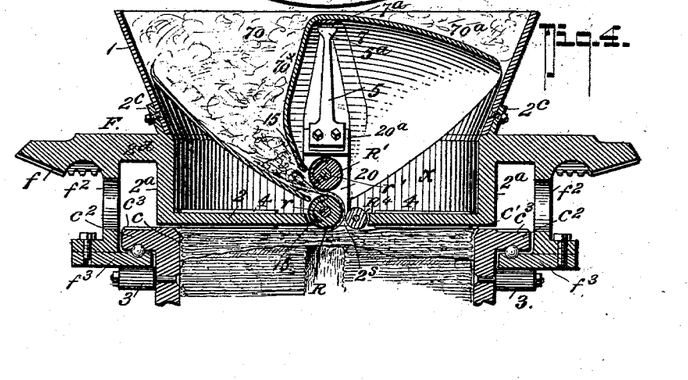
Fig. 4 is a vertical section of the same, on the line 4 4 of Fig. 3.

Coöperatively joined with each feed-slot $2^s$ is an independently-operating means in the nature of bat-forming compressing-rolls for effecting an initial pressure and expulsion of air from the cotton, for laying the bat in spiral laps, and for imparting a final pressure on the accumulating end of the column. The said means consists of a pair of opposing rolls R R', which may have a solid impacting-surface, as shown in Fig. 2, or yielding surface, as shown in Fig. 4. In the preferred construction the rolls R R' are superposed or in a vertical plane; but such position of rolls is not absolutely necessary to effect the general results desired, they being preferably so arranged to adapt them for a practical use with a preferred form of feeding device, presently explained. In the preferred construction the rolls R R' are arranged in a vertical plane, the lower roll R being disposed in the slot $2^s$, with its lower edge in a plane with or slightly below the lower or bearing face of the presser-rollers 4 4, as clearly shown in Fig. 4, by reference to which and to Fig. 2 it will be noticed the rolls R R' each have a central shaft, (indicated by $r$ $r'$,) the inner end $r^x$ of which journals in the central block 20 and the outer end extends through bearing-orifices $2^h$ in the vertical part $2^a$.

$R^2$ $R^3$ designate cog-gears mounted on the outer ends of the shafts $r$ $r'$, held in mesh, and the lower one $R^2$ to engage and travel upon the tooth-surface $c^3$ of the rim $c^2$ of the bale or stationary chamber C.

By providing a central block 20 it is manifest a number of bat-forming rolls may be provided, corresponding to the number of slots $2^s$ in the member 2, as the inner ends of the shafts or spindles of said rolls can be conveniently journaled in the central block 20. This block in practice does not require great breadth or width, and hence but little open space or core is produced in the center of the bale.

The vertical or superposed arrangement of the rolls is very advantageous, as it admits of setting the bat forming or compressing rolls in a convenient position to materially assist in effecting a positive and perfect feed of the cotton thereto, and from them into the baling-chamber.

Figure 3:
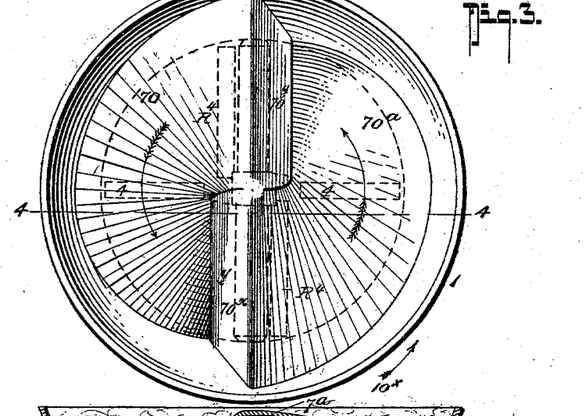
Fig. 3 is a plan view of the rotary hopper and the combined agitator and feedway devices.

The drive-shaft G in operation conveys a rotary motion to the frame F and the parts carried thereon in the direction indicated by arrow $10^x$ in Fig. 3, and, by reason of the gear $R^2$ engaging the fixedly-held gear-track $c^2$ in the manner shown and hereinbefore described, motion is imparted to the rolls R R' in opposite directions, as indicated by the arrows 15 15 in Fig. 4, which motion, it will be observed, is in the direction of movement of the rolls about the axial center of the bale-column being formed.

It is manifest that by the construction of the several parts as stated the fibrous material as it is drawn in between the feed-rolls is subjected to a pressure sufficient to expel all air therefrom and to reduce it to a thin compact uniform bat or sheet before it is laid spirally upon the column being formed in the baling-chamber, and by reason of its being fed onto the column end in such shape very little final pressure need be applied to the material under the slotted head or abutment to reduce the bulk to the desired density. Another and very advantageous result in handling the fibrous material in the manner explained is that danger of pulling, tearing, or otherwise injuring the fibers of the staple being baled is reduced to the minimum, for the reason that all layers of the column are deposited in substantially the same dense thickness and weight, thereby making it possible to form a column built up of spiral end laps capable of being unwound and spread out into a continuous unbroken sheet of uniform thickness and density throughout.

To absolutely overcome bridging and choking of the material and to maintain a substantially uniform feed of the material to the rolls, especially when they are arranged in the preferred way, as shown in Fig. 4, a special form of hopper-bottom is provided. The bottom 7 is centrally and loosely supported upon the standard 5, and is of such diameter relatively to the coincident diameter of the hopper adjacent the peripheral edges of the said bottom 7 to permit of a limited gyratory movement of the hopper-bottom 7, such movement being also made possible by reason of a ball-bearing 7ª, made fast to the under side of the center of the bottom 7 and adapted to detachably seat in the socket 5ª. When two sets of compressing or bat-forming rolls R R' are employed, as shown in Figs. 2 and 3, the hopper-bottom 7 is made of two sections, (indicated by 70 70ª,) one of which, 70, gradually inclines spirally from the top down in a forward direction—that is, in the direction of rotation of the hopper 1—and terminates at the throat or entrant end of the rolls R R' at one side, while the other section 70ª likewise inclines toward the other set of rolls R R'. To positively guide the material directly to the entrant side of the said rolls, each hopper-section also includes a deflector or guide portion 70ˣ 70ʸ, which extends down in such proximity to the upper roll R' as to prevent the material passing thereover. By reason of the peculiar construction of the hopper-bottom it will be apparent that the staple as it is fed into the fixedly-held hopper-section H and passes down onto the bottom 7 will be divided into two separate bulks, each of which is whirled around in the direction of rotation of the hopper 1 and caused to gravitate downward in the same direction toward the rolls R R', clogging or bridging on said bottom being overcome by the spirally-inclined ways, the forward thrust of the bulk, and the gyratory action of the bottom.

To facilitate the laying of the bat or sheet when the rolls are arranged as in Fig. 4, a supplemental roll R⁴ is used to avoid the said bat or sheet engaging an abrupt edge in its passage through the slot in the head or abutment 2.

Figure 5:
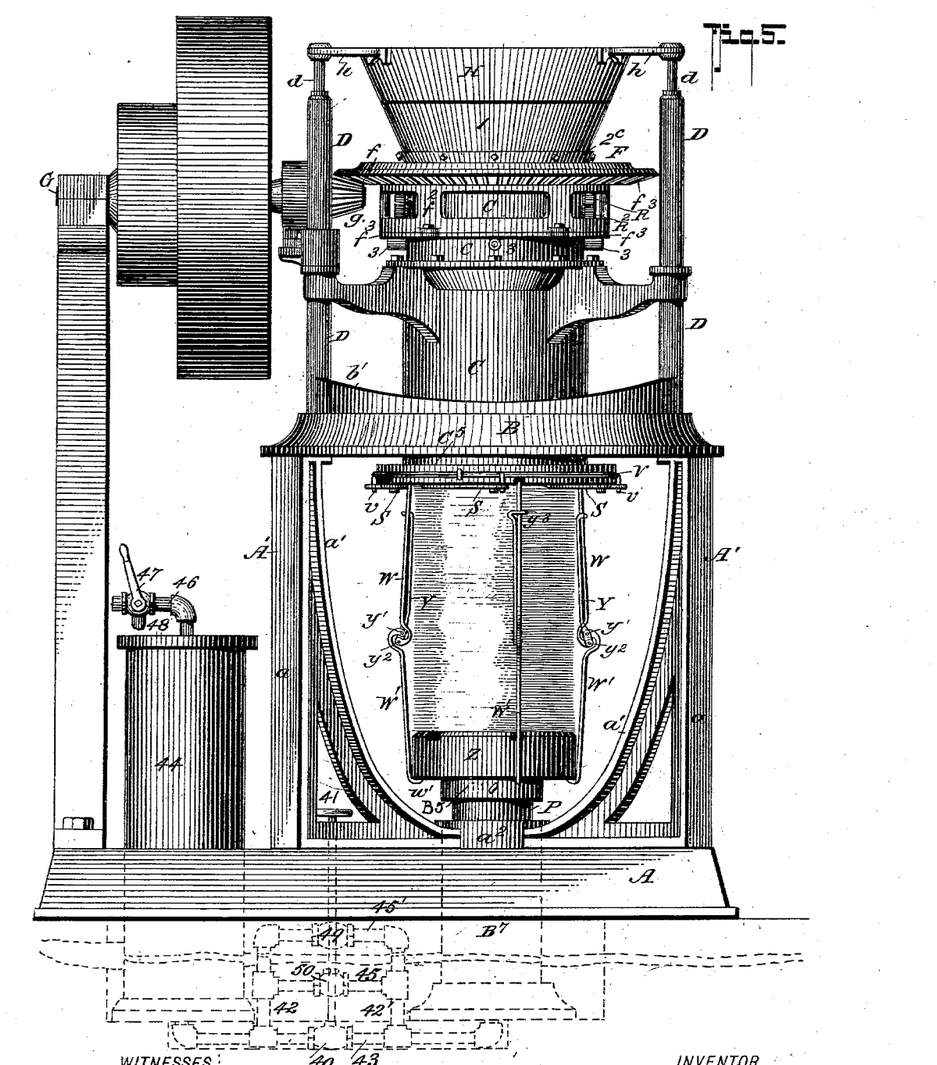
Fig. 5 is a side elevation of the press, the bale-stays being shown applied to the lower end of the compressed column.

To obtain the best results in baling apparatus of the character described, and especially for exerting a final compression to the material as it is delivered into the baling-chamber, means are provided for resisting the movement of the compressed material away from the head or abutment 2, or, in other words, for maintaining its pressure against the abutment, so that the new material entered between the abutment and the condensed material is itself subjected to a final compression to such a degree where its resistance to further compression is sufficient to overcome the resistance that holds the mass of compressed material against the abutment. It should be here stated that by reason of the condensed or bat-like condition in which the material is entered under the abutment in my form of press the perimeter or external surfaces of the column will present a substantially smooth surface as against the fluffy surface usually incident in the columns built upon the Lowry type of presses aforesaid, and the resistance or opposing friction existent where the external surface of the column is more or less fluffy is thereby overcome and the column fed down in a uniform manner. Again, by reason of the initial and in my press the most complete compression of the material being effected prior to the entrance of the material under the abutment a very powerful final pressure is not required. As a uniformly-resisting or back pressure on the column is necessary under all conditions to effect a proper and regular accumulation or column of compressed material, I employ a receding follower, which, as before stated, may be arranged on the plan disclosed in the E. M. Ivens patent, No. 623,020, and which, briefly stated, comprises a receding platen B⁵ on the upper end of a plunger P, which has its piston-head operatively held in a hydraulic cylinder B⁷, mounted in such manner as to meet the conditions required. The cylinder B⁷ is connected with a suitable source of supply, preferably a reservoir containing water or other liquid under pressure and having its connecting-pipes provided with suitably-arranged pressure-regulating valve and exhausting means capable of being so adjusted and set to automatically allow for bleeding off or exhausting the fluid in cylinder B⁷ when the pressure on the follower B⁵ reaches a predetermined point, such connections also having hand-operated valve devices arranged to be conveniently operated by the attendant to permit of a rapid or intermittent receding of the platen and a quick upward movement thereof, as conditions may require. To make this feature of my complete press better understood, the receiver is designated by 44 in Figs. 1 and 5, and the steam or other fluid pressure pipe that joins with the top thereof, 46, has a two-way cock 47 and an exhaust or waste pipe 48. The adjustment of cock 47 in one direction will allow steam to enter the receiver 44 and press on the water body therein, and when the handle of cock 47 is turned in the other direction live steam is cut off and the exhaust from receiver 44 allowed to pass off through pipe 48.

43 designates the pipe that joins the receiver 44 and cylinder B⁷ and has a hand-adjusted valve 40. Parallel pipes 42 42' join with the pipe 43 on opposite sides of valve 40, which are connected by the two horizontal pipes 45 45'. Pipe 45' has a pressure-regulator 49, and pipe 45 has a check-valve 50. The pressure-regulator is of suitable construction, whereby it is adapted to open at a predetermined pressure. For example, when set, say, at one hundred pounds in such case the plunger and head of the hydrostatic press will not recede until the pressure of cotton between the abutment and the follower equals or exceeds such amount, and thus the platen will be automatically and gradually lowered as the cotton is folded and pressed to such degree in the baling-chamber.

Figure 6:
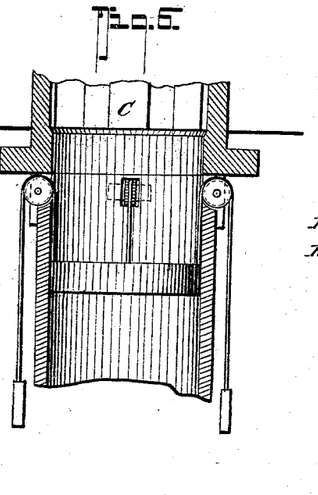

While I prefer in the most practical type of my press to use a hydrostatic receding follower mechanism, as stated, my invention is not confined to such receding mechanism, as the initial compressing mechanism may be coöperatively combined with a counterbalance follower mechanism, as diagrammatically illustrated in Fig. 6.

So far as described it will be readily apparent to those skilled in the art to which my invention belongs that in the starting of the bale it is only necessary to shift the follower to its uppermost position to have it nearly directly under the abutment or at least sufficiently away to allow for a few layers or spiral laps being laid thereon before any final pressure is exerted thereon and to provide a soft base, upon which the accumulating laps are deposited in superimposed layers. Thus no initial filling of loose material in the baling-chamber and onto the receding follower is necessary at the start, as the pressed bat is at once laid in position on the follower platen or head.

To render the press one of maximum capacity, I have provided a simple form of severing mechanism, which also serves as a means for sustaining the upper part of the severed column during the operation of temporarily binding the severed bale-section, and thereby avoid the necessity of stopping the operation of building up the compressed column. The severing means, which is illustrated in detail in Figs. 9 and 10, comprises a number (four being shown) of cutting blades or arms S, pivotally mounted upon the under face of the rim $C^5$, that forms the lower end of the baling-chamber. The arms or cutters S are each curved to lie with their cutting edges outside of the circular space or chamber through which the column passes when drawn in to their normal position, as clearly illustrated in Fig. 9. The four blades S, it will be noticed, are quadrantly disposed upon the rim $C^5$ and are mounted to swing in a horizontal plane and with the point or inner ends to move toward the center or axial point of the column made when swung inward to their severing position. The several cutters may be independently operated; but for a quick action I prefer to join them to move in unison, and for such purpose the head or outer ends of the members S have slots S' radial to their pivotal axis, into which project the pendent studs or fingers $v\ v$ of a rotary lever V in the nature of a stout band or rod rotatably held within an annular groove $C^6$ in the outer edge of the rim $C^5$ and which has a suitably-disposed hand-lever V', as shown.

Figure 9:
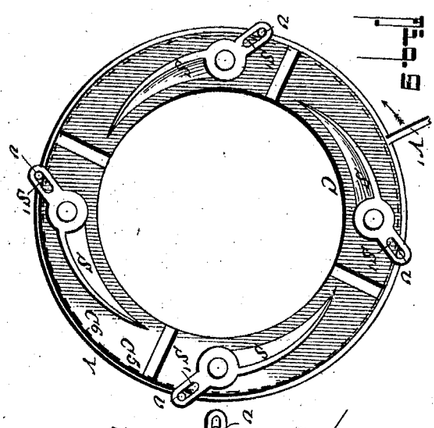
Fig. 9 is an inverted plan view of the lower end of the baling-chamber with my improved severing mechanism, the cutters or blades being in their normal or inoperative position.
Figure 10:
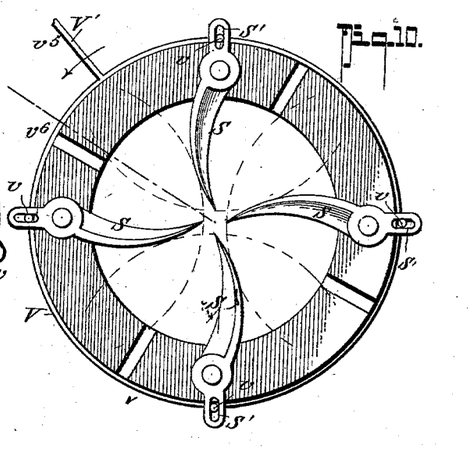
Fig. 10 is a similar view, the blades being shown as moved inward to their operative position.

By providing a severing mechanism as described it is manifest that when the column is of a length sufficient to admit of severing the lower part—that is, to form the bale—the operator by swinging the lever V' in the direction indicated by the arrow in Fig. 9 will cause the members S to cut into the column to such degree as to meet the condition required, it being apparent from Figs. 9 and 10 that by bringing the lever V' to the point marked $v^5$ on Fig. 10 the members S will be caused to enter with their points at the center of the column, and if turned to the point $v^6$ the said members S will have been swept entirely through the column. This latter positioning of the members S under ordinary conditions is not necessary, as a partial cutting into the column will suffice for effecting a practical severing of the compressed column, and by reason of such partial thrust of the members S into the compressed mass they will act as supports for holding up the bulk contained within the baling-chamber, and thereby admit of the continuation of laying the end laps on said bulk while the severed or lower end of the column is being temporarily bound and removed from under the upper or remaining part of the column and until the platen of the receding follower is again thrust upward in position to again support and effect a contra pressure thereon, it being understood that so soon as the platen or follower head is moved up the members S are swung outward and returned to their normal position by moving the lever back in the direction indicated by the arrow $V^2$.

I have illustrated simple, easily-manipulated, and effectively-operating bale-stay-band devices for engaging the bale during its removal from the press and until the permanent securing-wires or other devices are applied to the bale.

In handling bales of the character stated by reason of the tendency of the detached part of the column to expand endwise it has been found necessary to apply a means for temporarily holding the detached part or bale from such expansion during the time it is removed from the press and the application of the permanent tie devices.

I am aware that bale-stays have heretofore been provided consisting of members adapted to be drawn taut by the endwise-expansive force of the bale.

Figure 11:
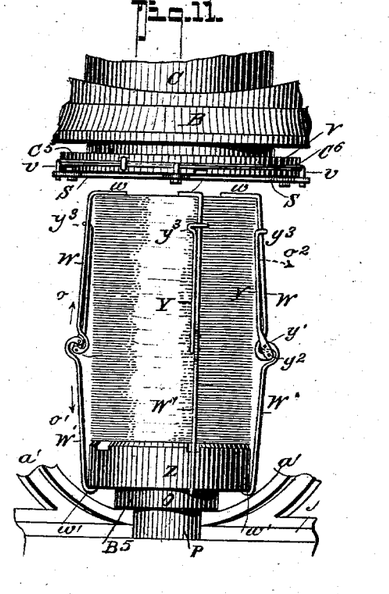
Fig. 11 is a side view of a portion of the press, illustrating the bale-stays as applied.
Figure 12:
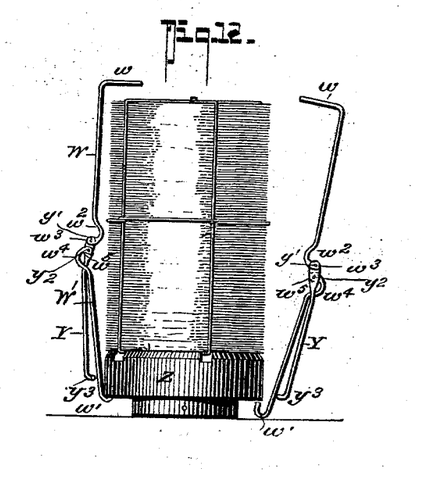
Fig. 12 is a view illustrating the manner of removing the said stays after the bale is permanently tied.

The type of band-stay illustrated in Figs. 11 and 12 is especially designed for being expeditiously applied during the continuous running of the press and without interfering with the operation of forming the compressed column. The stay consists of two members of like construction, but combined to act as opposing each other, whereby the greater the pulling action on each in the direction of their length the more positive will be their interlocking condition and their expansion in the direction of their length arrested. As shown, the stay members consist of forged or otherwise-formed stout metal rods W W', one end of each of which terminates in a right-angle hook $w$ $w'$. The other or opposing ends of the rods W and W' terminate the one, W, with an inwardly-curved part or loop $w^2$, the end $w^3$ of which extends outward (in relation to its hook $w$) and terminates at a point beyond the vertical part of the rod, and the opposing end of the member W' is likewise formed with a loop part $w^4$, that bends outward, or, in other words, in a direction opposite the bend of the loop $w^2$, and has its end $w^5$ projected inward in a plane inside of the vertical part of said rod W'. When coöperatively arranged, the ends $w^3$ $w^3$ are disposed in the same vertical plane and to overlap each other to form, as it were, an articulated joint, which is maintained in a combined locking and releasing lever Y, the lower end of which is pivotally joined to both ends $w^3$ and $w^5$ by the pins $y'$ $y^2$. The lever Y extends upward and terminates with an angle or heel portion $y^3$, that forms a convenient handle for pulling out the lever when it is desired to unlock or release the stay and as a detent to engage the rod W and hold the members W and W' to their locked position when endwise pull is exerted on the said members W W' during their application to the bale. As will be seen from Fig. 11, when applied the two pivotal points $y'$ $y^2$ are out of a vertical plane, and by reason of the pull strain in opposite directions (see arrows $o$ $o'$) the two ends are maintained in a tightly-interlocked condition. To remove the stays, it is only necessary to pull the lever Y outward (see arrow $o^2$, Fig. 11) to bring the pivotal points $y'$ $y^2$ in a vertical plane. The lower hooks of the stays are made to engage a base-block Z.

I do not confine myself to the use of the special form of bale-stay described and shown, as other stays suitable for the conditions required may be employed.

Having thus described the detailed construction of my improved compress and in a general way explained the operation of the several mechanisms, further detailed description is deemed unnecessary, as it is believed the complete operation and advantage of my invention will be readily understood by those skilled in the art to which it appertains. It will be noticed the operation of making and compressing the bale is very simple.

In baling cotton the material may be discharged directly from the gin into the hopper 1, in which it is conveyed in the direction of rotation of and with the hopper and gently agitated to feed toward the bat-forming rolls, which operate continuously as the hopper is rotated. As the bat is formed and the cotton thereby receives its greatest compression, the bat or sheet is constantly conveyed around the axial center of the hopper and lapped spirally on the column being formed by the same means that effects the initial compression. The column by reason of its compactness and the smooth finish of its outer sides recedes freely and with a minimum friction on the side walls of the baling-chamber and travels down with the receding follower until a sufficient amount of the column is exposed to provide for the desired length of the bale. The severing-cutters are then forced into the column, which arrests further downthrust of the column-section above them and permits of the application of the bale-stays, while the compressing and bat-laying operation continues. After the bale-stays are applied the bale is removed, the follower or platen thrust up under the column, and the cutters swung out of the path of the then again receding column.

It is obvious many variations, modifications, and changes in the details of constructions of the parts above described and shown may readily manifest themselves to those skilled in the art that will fall within the spirit of my invention and the scope of the appended claims, and I therefore do not desire to limit myself to or be restricted in the exact details, combinations, and special arrangement of parts shown.

Figure 7:
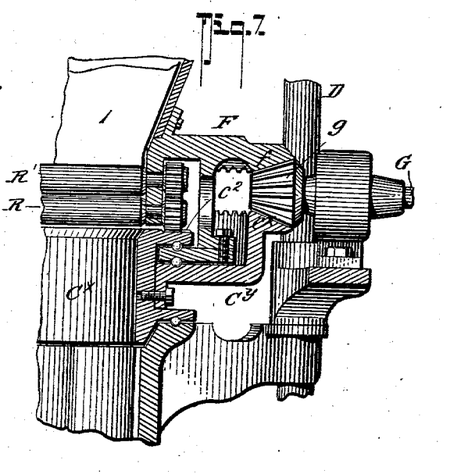
Fig. 7 is a similar view of a further modification, hereinafter also explained.
Figure 8:
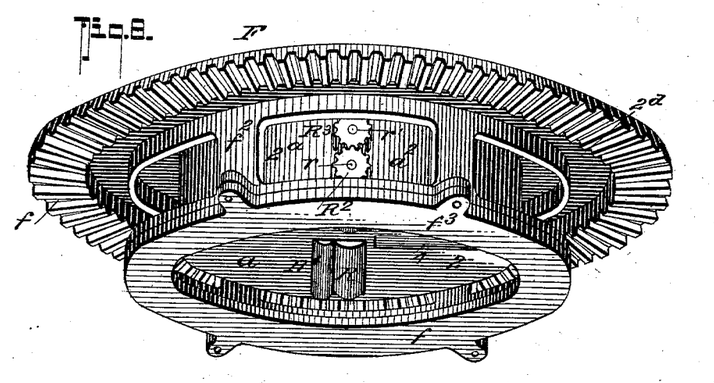
Fig. 8 is an inverted perspective view of the hopper with its component parts.

In Fig. 7 I have shown the receiving-chamber C with the upper part $C^X$ rotatable and provided with a gear-rim $c^7$, adapted to mesh with the drive-gear $g$, that engages the master gear-rim $f$. By this arrangement both the receiving-chamber and the frame F, with the hopper 1, the bat forming and laying mechanism, and the slotted head, are rotatable, with the member $C^X$ rotatable in reverse direction to the rotation of the frame F.

Having thus described my invention, what I claim, and desire to secure by Letters Patent, is—

1. In a cotton or other press, an open-ended receiving-chamber and a slotted head-plate, in combination with means for reducing the material into a thin bat or sheet, and simultaneously feeding it through the slotted head-plate into the receiving-chamber, and subjecting the same to pressure, said means including a pair of superposed rolls and a support therefor revoluble about the axis of the receiving-chamber, as set forth.

2. In a press of the character described, an open-ended receiving-chamber, a hopper having a radially-slotted bottom, and means mounted on said bottom to first compress the material into a thin sheet, and then feed the sheet through the slotted hopper-bottom, as described.

3. In a press as described, a press-chamber, a slotted head-plate therefor, a bat-forming means carried on the head-plate revoluble about the axis of the press-chamber, comprising superposed rolls and a conveyer for leading the loose material in the direction of the movement of the bat-forming rolls and between their compressing-surfaces, for the purposes described.

4. In a cotton-baling press of the character described, a revoluble hopper, a baling-chamber, a revoluble head in the entrant end of the said chamber, and a bat-forming means, comprising a pair of superposed rolls mounted on the head-plate, and disposed radially relatively to the baling-chamber, and means for imparting opposite rotation to the two rollers as they are horizontally revolved with the head-plate.

5. In a machine for compressing fibrous material, the combination with a slotted head-plate, a hopper over said plate, said hopper including a bottom centrally suspended and having inclined ways leading to the slots in the head-plate for guiding the material thereto.

6. In a machine for compressing fibrous material, substantially as described, the combination of a baling-chamber, a slotted head-plate, revoluble over the entrant end of said chamber, a hopper-section fixedly connected to and revoluble with the head-plate, said hopper including spiral ways inclined downward in the direction of revolution of the hopper and the head, for leading the loose material to the slots.

7. In a cotton or other press, means for reducing the loose material into a bat or sheet, and laying said sheet in spiral superimposed end laps, said means including a pair of superposed rolls, and means for rotating them relatively to each other and revolving both around a central axis, as set forth.

8. In a machine for compressing fibrous or other material, the combination with a receiving-chamber, and means for reducing the material to a bat, operative over the chamber, and adapted to lay the bat in superimposed layers therein; of an independently-supported hopper, and an independently-supported bottom therefor having guideways for leading the material to the bat-forming means, for the purposes specified.

9. In a machine for compressing fibrous material, the combination with a receiving-chamber for the compressed material; of a hopper revoluble over the entrant end of the receiving-chamber, said hopper having a slotted head-plate movable therewith, and a supplemental bottom pivotally mounted on the hopper, and having portions for directing and concentrating the fibrous material toward the slots in the head-plate, for the purposes specified.

10. In a press of the character described, in combination with a receiving-chamber, and means for feeding the material in superimposed laps into said chamber, said chamber having an annular surface surrounding its discharge end; of a series of combined severing and sustaining members pivotally mounted on the annular surface, adapted to sweep in a horizontal plane and penetrate the column at a point in line with the lower edge of the receiving-chamber, and means for imparting motion to said severing members, substantially as shown and for the purposes described.

11. In a machine of the character described, a severing mechanism, comprising in combination with the discharge end of the bale-receiving chamber; said chamber having an annular flange surrounding the discharge end, radially-disposed combined cutter and sustaining members pivotally mounted on the annular flange to sweep across the discharge end of the receiving-chamber, and a lever mechanism, rotatably mounted on the annular flange of the said chamber joined with the cutter-arms, and adapted to impart sweep movements thereto in unison, as set forth.

12. In a machine for compressing fibrous material, the combination with the stationary receiving-chamber, and the rotatable hopper-section, said section including the slotted head-plate or abutment; of the radially-disposed compressing-rolls mounted on the head-plate, and adapted to discharge the compressed bat or sheet into the slots of the head-plate, and an independently centrally supported hopper-bottom, having a separate guideway or incline for each set of rolls, adapted to lead the material to said rolls in independent bulks, and mechanism for revolving the hopper with the bat-forming rolls about the axial center of the receiving-chamber and rotating the bat-forming rolls on their own axes, substantially as shown and described.

13. The combination with the stationary receiving-chamber C, having an annular cog-rim $c^2$, and radial roller-supports, the frame F revoluble over the upper end of the chamber C, having a pendent flange, adapted to rest and rotate upon the radial roller-supports, said frame F having a slotted bottom or head-plate, superposed compressing-rollers coöperating with the slots and adapted to reduce the material to a bat or sheet prior to its passage through the slots, and to feed said sheet or bat into the slots, the gear $g$, and drive-shaft for imparting rotation to the frame F, substantially as and for the purposes described.

14. The combination with the chamber C, and the fixedly-held hopper; of a supplemental hopper held between the fixed hopper and the entrant end of the chamber C, said hopper including a slotted bottom for opposing the entrant end of the chamber C, over which it has a radial sweep, bat-forming rolls mounted on said bottom to move therewith, means for imparting a rotary motion to the rolls as they move around with the hopper and a supplemental bottom loosely supported in the hopper to revolve therewith, said supplemental bottom having independent guideways, inclined downwardly to the entrant edges of the bat-forming rolls, all being arranged substantially as shown and for the purposes described.

15. The combination with the receiving-chamber and the independently-supported hopper, having a radially-slotted bottom, and means for rotating the hopper about the axial center of the receiving-chamber; of a hopper-bottom loosely held on the hopper, means for pivotally supporting said hopper over the axial center of the head-plate, said bottom having independent guideways, leading toward the slots in the head-plate, as specified.

FRED G. DIETERICH.

Witnesses:
SOLON C. KEMON,
JESSE MIDDLETON.